(12) United States Patent
Sasse et al.

(10) Patent No.: US 6,471,021 B1
(45) Date of Patent: Oct. 29, 2002

(54) HYDRODYNAMIC COUPLING DEVICE

(75) Inventors: Christoph Sasse, Schweinfurt; Peter Frey, Gerolzhofen; Sven Koepke, Rieden; Roland Illig, Heustreu; Bernd Schöder, Münnerstadt; Ralf Rönnebeck, Schonungen, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 22 days.

(21) Appl. No.: 09/707,234

(22) Filed: Nov. 6, 2000

(30) Foreign Application Priority Data

Nov. 4, 1999 (DE) .......................................... 199 53 172

(51) Int. Cl.[7] .............................................. F16H 45/02
(52) U.S. Cl. .................................. 192/3.29; 192/110 B
(58) Field of Search ............................. 192/3.28, 3.29, 192/3.3, 110 B; 60/330, 339

(56) References Cited

U.S. PATENT DOCUMENTS

RE31,621 E  * 7/1984 Moroto et al. ............. 192/3.28
5,209,330 A  * 5/1993 Macdonald ................. 192/3.29
5,215,173 A  * 6/1993 Gimmler ..................... 192/3.3
5,566,801 A  * 10/1996 Fukunaga et al. ......... 192/3.29
5,769,196 A  * 6/1998 Murata ....................... 192/3.29
6,024,195 A  * 2/2000 Hinkel ........................ 192/3.28

FOREIGN PATENT DOCUMENTS

DE          44 23 640 A1     6/1995
DE          199 09 349 A1    9/1999

* cited by examiner

*Primary Examiner*—Richard M. Lorence
(74) *Attorney, Agent, or Firm*—Cohen, Pontani, Lieberman & Pavane

(57) ABSTRACT

A hydrodynamic coupling device having a housing which is, or can be, filled with hydraulic fluid, a turbine wheel which is rotatably arranged in the housing and is, or can be, connected to an output shaft for joint rotation, and a sliding bearing arrangement which the turbine wheel is rotatably mounted relative to the housing, and which has a hydraulic fluid channel arrangement for the passage of hydraulic fluid from radially outside to radially inside relative to the region of the output shaft, or vice versa. It is provided in this case that the sliding bearing arrangement has a sliding bearing element fixed on the turbine wheel, and wherein the sliding bearing element supports the turbine wheel in the axial and radial directions relative to the housing

19 Claims, 6 Drawing Sheets

HYDRODYNAMIC COUPLING DEVICE

BACKGROUND OF THE INVENTION

1. Field of the Invention

The present invention relates to a hydrodynamic coupling device, in particular a hydrodynamic torque converter or fluid clutch, comprising a housing which is, or can be, filled with hydraulic fluid, a turbine wheel which is rotatably arranged in the housing and is, or can be, connected to an output shaft for joint rotation, and a sliding bearing arrangement by means of which the turbine wheel is rotatably mounted relative to the housing, and which has a hydraulic fluid channel arrangement for the passage of hydraulic fluid from radially outside to radially inside relative to the region of the output shaft, or vice versa.

2. Description of the Related Art

Such a hydrodynamic coupling device in the form of a hydrodynamic torque converter is known from DE 44 23 640 A1. A critical region of such hydrodynamic coupling devices is that region in which, for example, hydraulic fluid flowing up from radially outside must be led to leave the interior of the housing into the central region in which it can then be removed via an axial passage opening, for example in the output shaft. It must be ensured in this region, on the one hand, that a suitable bearing or support of the turbine wheel or of the free end of the output shaft, in general a transmission input shaft, is provided relative to the housing, but that, the hydraulic fluid can flow into this radially inner region without eddies being produced in rotary operation. For this purpose, it is known, for example, to weld into a housing cover as a central part thereof a bearing element which has bores for the passage of oil which lead radially inward, the support by means of a rolling-element bearing also being performed simultaneously at this component. It is also known to use bearings, for example sliding bearings, supported axially on the housing, on the one hand, and on the turbine wheel, on the other hand, for suitable support, these bearings then having channel-like passage regions, in order to guide the fluid radially inward.

DE 199 09 349 A1 discloses a hydrodynamic coupling device in the form of a hydrodynamic torque converter in the case of which, ultimately, the output shaft and the turbine wheel coupled to the latter for joint rotation is not supported in the free end region of the output shaft relative to the housing. Furthermore, there is arranged on the housing a fluid flow guiding element which deflects the radially approaching hydraulic fluid into the axial passage opening of the output shaft.

SUMMARY OF THE INVENTION

It is the object of the present invention to develop a hydrodynamic coupling device of the generic type so as to permit the converter hydraulic fluid to flow radially in a fashion essentially uninfluenced by eddies in conjunction with a simple design.

In accordance with a first aspect of the present invention, this object is achieved by means of a hydrodynamic coupling device, in particular a hydrodynamic torque converter or fluid clutch, comprising a housing which is, or can be, filled with hydraulic fluid, a turbine wheel which is rotatably arranged in the housing and is, or can be, connected to an output shaft for joint rotation, and a sliding bearing arrangement by means of which the turbine wheel is rotatably mounted relative to the housing, and which has a hydraulic fluid channel arrangement for the passage of hydraulic fluid from radially outside to radially inside relative to the region of the output shaft, or vice versa.

It is further provided in accordance with the invention that the sliding bearing arrangement comprises a sliding bearing element fixed on the turbine wheel, and that the sliding bearing element supports the turbine wheel in the axial and radial directions relative to the housing.

In the case of such a coupling device, the sliding bearing element ensures a suitable axial and radial support, it being possible to carry out the operation of assembly in a simplified fashion because this sliding bearing element is fixed on the turbine wheel. The sliding bearing element nevertheless permits the hydraulic fluid to pass via the hydraulic fluid channel arrangement, so that it is possible to dispense with separate modules therefor.

The design of the device according to the invention can be simplified by virtue of the fact that the sliding bearing element is supported on an inner surface of the housing with a surface region facing the housing. It is particularly advantageous in this case for reasons of production engineering when at least one, preferably a plurality of, groove-like depression(s) is/are provided in the surface region for the purpose of providing the hydraulic fluid channel arrangement, the at least one groove-like depression being covered at least partially by the inner surface of the housing.

It can further be provided that the sliding bearing element has a fastening region with the aid of which said element is fixed on the turbine wheel, preferably a turbine wheel hub of the same. Here also, the design becomes simpler again when the fastening region is connected to the turbine wheel by being pressed in.

In order both to meet the requirements occurring in rotary operation and to be able to carry out the production as simply and cost-effectively as possible, it is proposed that the sliding bearing element is formed from plastic, preferably polyamide 6,6 (PA6,6), polyamide 4,6 (PA4,6) or polyether ketone (PEK), from sintered metal or aluminum.

In order to provide the bearing function addressed both in the axial and in the radial direction, it is proposed that the sliding bearing element has an axial bearing surface region extending essentially radially, and a radial bearing surface region extending essentially axially.

Alternatively, or in addition, it can be provided that the sliding bearing element has an axial/radial bearing surface region constructed in an essentially frustoconical fashion. A suitable centering of the two modules to be brought into rotary connection with one another is simultaneously achieved in this way.

In order, furthermore, to permit hydraulic fluid to approach from and to the axial passage opening, it is proposed that in its region near the axis of rotation, the sliding bearing element has a passage opening for connecting the hydraulic fluid channel arrangement to an axial passage opening constructed in the output shaft.

In the case of such hydrodynamic coupling devices, provision is generally made of a lockup clutch which, for the purpose of producing an essentially direct torque transmitting connection between the housing and the turbine wheel comprises an axially movable clutch element. In order to ensure in the case of such a variant embodiment with a lockup clutch that a tight seal is created relative to the housing in the region of the guidance of the clutch element in conjunction with axial mobility of the clutch element, it is proposed that provided on the housing in a fashion surrounding the sliding bearing element is a guide element on which a clutch element of a lockup clutch is guided such that it can be moved in the axial direction, that the guide element has a hydraulic fluid channel arrangement which is connected for fluid exchange to the hydraulic fluid channel arrangement in the sliding bearing element, and that the guide element is sealed off from the turbine wheel or/and the sliding bearing element in such a way that an exchange of hydraulic fluid is possible only via the two hydraulic fluid channel arrangements.

In accordance with a further aspect of the present invention, the object mentioned at the beginning is achieved by means of a hydrodynamic coupling device, in particular a hydrodynamic torque converter or fluid clutch, comprising a housing which is, or can be, filled with hydraulic fluid, a turbine wheel which is rotatably arranged in the housing and is, or can be, connected to an output shaft for joint rotation, and a bearing arrangement by means of which the turbine wheel is rotatably supported relative to the housing, and which has a hydraulic fluid channel arrangement for the passage of hydraulic fluid from radially outside to radially inside relative to the region of the output shaft, or vice versa, the bearing arrangement having a bearing which supports the turbine wheel axially and radially relative to the housing.

It is further provided in accordance with the invention that the bearing arrangement comprises a bearing element which is fixed on an inner surface of the housing and which has on its surface facing the inner surface of the housing at least one, preferably a plurality of, groove-like depression(s) which, for the purpose of providing the hydraulic fluid channel arrangement, is/are covered at least partially by the inner surface of the housing, and that the bearing is supported on the housing side on the bearing element.

The functioning of the hydraulic fluid guidance on the one hand, and the functioning of the axial or radial support of the turbine wheel relative to the housing on the other hand, can be provided in a very narrow spatial region in this way.

Given the use of a lockup clutch arrangement, it is preferred in this case that a clutch element of a lockup clutch arrangement is guided such that it can be moved axially on the bearing element. Thus, in the case of this embodiment the bearing element itself can also simultaneously take over the guidance of the clutch element.

It is preferably provided that the clutch element is connected in an essentially rotationally secure fashion to the bearing element. In order to ensure the passage of fluid from or to the axial passage opening in the output shaft in a fashion as free from disturbance as possible, it is further proposed that the bearing element is sealed off from the output shaft in its radially inner region.

In accordance with a further aspect of the present invention, the object named at the beginning is achieved by means of a hydrodynamic coupling device, in particular a hydrodynamic torque converter or fluid clutch, comprising a housing which is, or can be, filled with hydraulic fluid, a turbine wheel which is rotatably arranged in the housing and is, or can be, connected to an output shaft for joint rotation, a bearing arrangement by means of which the turbine wheel is supported axially and, if appropriate, radially relative to the housing, a hydraulic fluid channel arrangement, via which the passage of hydraulic fluid is possible from radially outside relative to the region of the output shaft, and vice versa.

It is provided in this case that the hydraulic fluid channel arrangement in a turbine wheel hub of the turbine wheel comprises at least one first passage opening extending essentially radially, and comprises in the output shaft at least one second passage opening which is connected to an axial passage opening of said shaft and extends essentially radially. This arrangement also ensures the axial and radial bearing of the turbine wheel relative to the housing, and the guidance of the hydraulic fluid in a region near the output shaft.

In order to permit a throughflow which is as free from disturbance as possible, it is advantageous in this case when the at least one first passage opening and the at least one second passage opening are situated in the same axial region.

It is advantageous, moreover, when the at least one first passage opening and the at least one second passage opening open into an interspace formed between the turbine wheel hub and the output shaft and preferably axially sealed off.

In accordance with a further aspect, the object mentioned at the beginning is achieved by means of a hydrodynamic coupling device, in particular a hydrodynamic torque converter or fluid clutch, comprising a housing which is, or can be, filled with hydraulic fluid, a turbine wheel which is rotatably arranged in the housing and is, or can be, connected to an output shaft for joint rotation, and a fluid guiding element which is provided on the housing and through which hydraulic fluid flowing up from radially outside is directed into an axial passage opening constructed in the output shaft, and vice versa.

This coupling device further has a bearing arrangement which is provided radially outside the fluid guiding element and by means of which the turbine wheel is supported axially and, if appropriate, radially relative to the housing.

It is possible in the case of this variant embodiment to obtain an assembly which is very easy to carry out by virtue of the fact that the fluid guiding element is pressed with a fastening section of the same into a depression in the housing.

For example, the bearing arrangement may comprise a sliding bearing or/and a rolling-element bearing.

In order to achieve a guidance of the hydraulic fluid which is essentially free from eddies in the radially inner region, it is proposed that the fluid guiding element has at least one, preferably a plurality of, groove-like fluid guiding depression(s) which is/are open on a side facing the output shaft.

The present invention is described below with reference to the attached drawings with the aid of preferred embodiments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
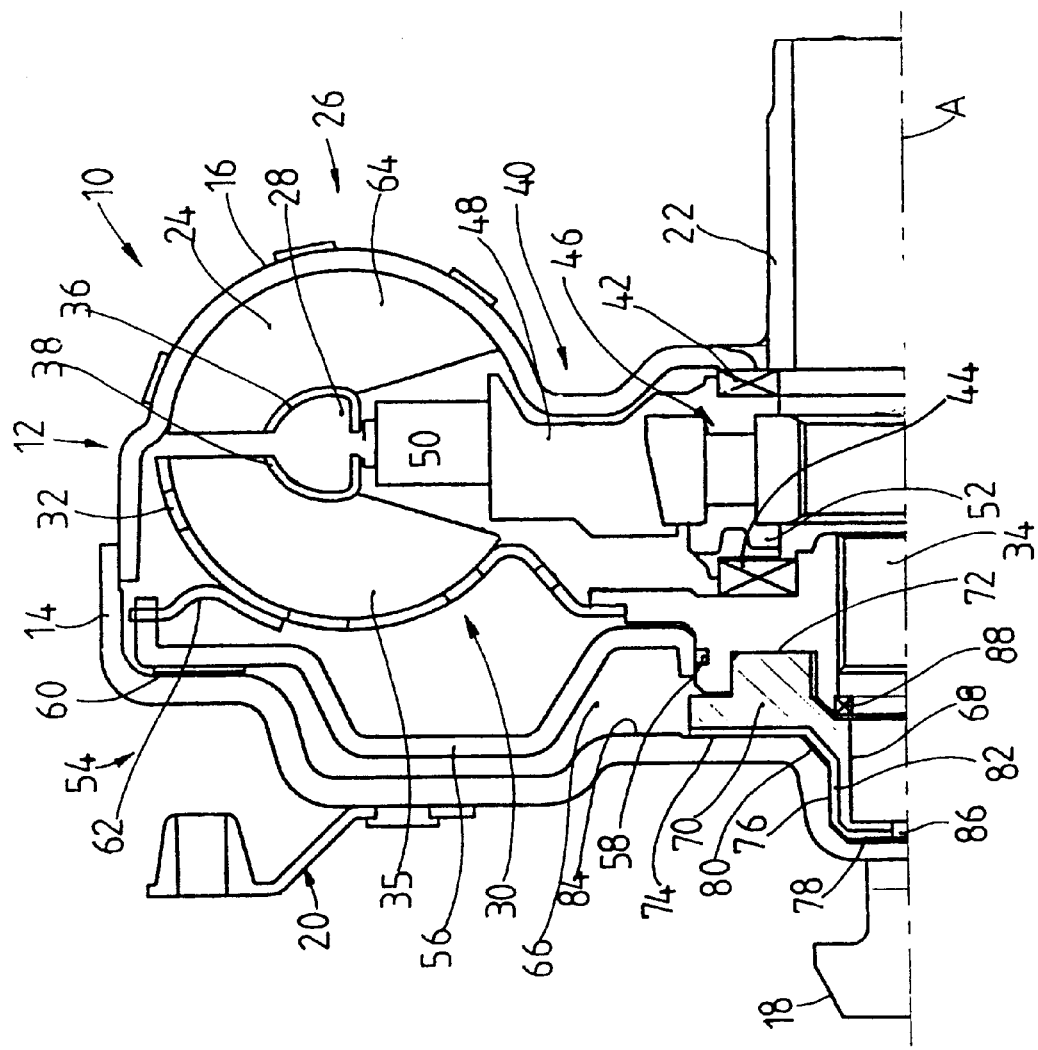
FIG. 1 shows a partial longitudinal section through a first variant embodiment of a coupling device according to the invention.

A hydrodynamic coupling device in accordance with the present invention is illustrated in FIG. 1 in the form of a hydrodynamic torque converter 10. The torque converter 10 comprises a housing, denoted in general by 12, which comprises a housing cover 14 and a pump impeller shell 16. The housing cover 14 carries a locating spigot 18 which is fixed, for example welded, thereon in the region near the axis of rotation A, and can be held in a bearing cutout of a drive shaft (not represented). Furthermore, there is provided on the housing cover 14 a fastening arrangement, denoted in general by 20, via which the housing is joined to the drive shaft in connection with a flexible plate or some other connecting arrangement.

The pump impeller shell 16 is connected in the radially inner region to a pump impeller hub 22, and forms with the latter and with a multiplicity of pump impeller blades 24 fitted on the pump impeller shell 16 a pump impeller denoted in general by 26. Furthermore, a turbine wheel denoted in general by 30 is provided in the interior 28 of the torque converter 10. The turbine wheel 30 comprises a turbine wheel shell 32 and a turbine wheel hub 34 connected for joint rotation to the turbine wheel shell 32 in the radially inner region. The turbine wheel shell 32 bears a multiplicity of turbine wheel blades 35 situated axially opposite the pump impeller blades 24. It may be pointed out that the pump impeller blades 24 and the turbine wheel blades 35 are respectively connected to inner shells 36 or 38 at their regions facing the respective other blades. The turbine wheel hub 34 is to be connected in a rotationally secure fashion, for example by means of a toothed spline system or the like, to an output shaft (not illustrated in FIG. 1), for example a transmission input shaft, which penetrates the pump impeller hub 22 in an essentially concentric fashion.

Situated axially between the pump impeller 26 and the turbine wheel 30 is a stator, denoted in general by 40, which is axially supported on the pump impeller 26 via a first bearing arrangement 42 and is axially supported on the turbine wheel 30, in particular the turbine wheel hub 34, via a second bearing arrangement 44. The stator 40 comprises a freewheeling mechanism 46 via which a stator outer ring 48 with the stator blades 50 supported thereon is supported on a support element (not illustrated in FIG. 1) constructed, for example, as a hollow shaft, in a direction such that it can rotate about the axis of rotation A. This support element also penetrates the pump impeller hub 22 coaxially and surrounds the output shaft (not illustrated) coaxially, as well, provided in the region of the axial support via the bearing 44 is a fluid passage 52 via which hydraulic fluid can be introduced into the interior 28 of the torque converter 10. It may be pointed out, furthermore, that an integrally cast thrust disk in the region of the bearing 42 on the stator outer ring 48 can serve the purpose of axial support.

The torque converter 10 further comprises a lockup clutch, denoted in general by 54, which has a clutch piston 56. The clutch piston 56 is guided such that it can be moved axially on the turbine wheel hub 34 in the radially inner region, and is sealed off from said hub by a sealing element 58. The clutch piston 56 bears a friction lining 60 radially on the outside and, in the event of an increase in the fluid pressure in the interior 28 of the torque converter 10, can be pressed against the housing 12, in particular the housing cover 14. Furthermore, via a toothed-type engagement, for example, the clutch piston 56 is connected radially on the outside in a rotationally secure fashion to the turbine wheel 30, that is to say a driver element 62 fixed on the turbine wheel shell 32, for example by laser welding.

The clutch piston 56 subdivides the interior 28 of the torque converter 10 into a first space 64 and a second space 66. The hydraulic fluid can be led into the first space 64 through the passage 52, it being evident that this space 64 is essentially formed between the clutch piston 56 and the pump impeller shell 16 and contains the turbine wheel 30. The fluid which has entered the second space 66 in the region of the friction lining 60 can be removed again via this space 66 in a way still to be described below, with the result that ultimately a fluid flow circuit is maintained, it being possible, for example, for the friction lining 60 to have lining grooves in order to permit the passage of fluid into the space 66 even in the engaged state of the lockup clutch 54.

It is to be seen that the turbine wheel 30 is supported axially on the housing 12, that is to say in the housing cover 14, via a sliding bearing element 68. This sliding bearing element 68 has, for example, an annular fastening projection 70 which is fixed in a corresponding cutout 72 in the turbine wheel hub 34 with a press fit. The sliding bearing element 68 is supported axially on the housing cover 14 with an axial bearing surface 74 extending in an essentially radial fashion, and therefore serves the purpose of axially bearing or supporting the turbine wheel 30 in the housing 12. The sliding bearing element 68 is supported in the radial direction in a pot-like depression 78 in the housing cover 14 with a surface region 76, extending in an essentially axial fashion and being constructed in an essentially cylindrical fashion, with the result that the radial support of the turbine wheel 30 relative to the housing 12 is ensured here. Situated between these two surface regions 74, 76 is a surface region 80 which is of essentially frustoconical construction and serves the purpose both of axial and of radial support and simultaneously ensures centering of the two modules, which rotate relative to one another.

In its surface adjoining the housing cover 14, the sliding bearing element 68 has a multiplicity of groove-like depressions 82 which extend from radially inside to radially outside, or vice versa, are open toward the housing cover 14 and are covered by the inner surface 84 of the latter. In the case of the fluid circulation previously addressed, the hydraulic fluid can approach the sliding bearing element 68 from radially outside, pass through the groove-like depressions 82 and reach the axial end of the output shaft (not represented in FIG. 1, but which rotates about axis A) via a passage opening 86 provided in the central region. This output shaft, which is sealed in a fluid-tight fashion relative to the turbine wheel hub 34 and also the sliding bearing element 68 by a seal 88, generally has an axial passage opening via which the hydraulic fluid can be removed and led to a sump or a pump.

The sliding bearing element 68 preferably consists of a material having a coefficient of friction which is low relative to the housing cover 14, which is generally formed from sheet steel. Use may be made here, for example, of plastic, preferably fiber-reinforced, such as polyamide 6,6 (PA6,6), polyamide 4,6 (PA4,6), polyether ketone (PEK), or also sintered metal or aluminum, in which case it is then possible to form the channels 82 at the same time as the shaping operation, or in a subsequent machining processing operation.

Pressing this sliding bearing element 68 into the turbine wheel hub 34 results in a permanent joining of these two modules, with the result that the subsequent assembly operation is simplified. The groove-like channels 82, which are open on one surface, can be of virtually any desired configuration, with the result that when they are being shaped it is possible to pay particular heed to the flow-specific properties thereof. That is to say, these channels need not extend strictly in an exactly radial direction, but lead from radially inside to radially outside, and vice versa, and can also simultaneously have components extending circumferentially in this case. This is the intention of the expression "essentially radially".

Figure 2:
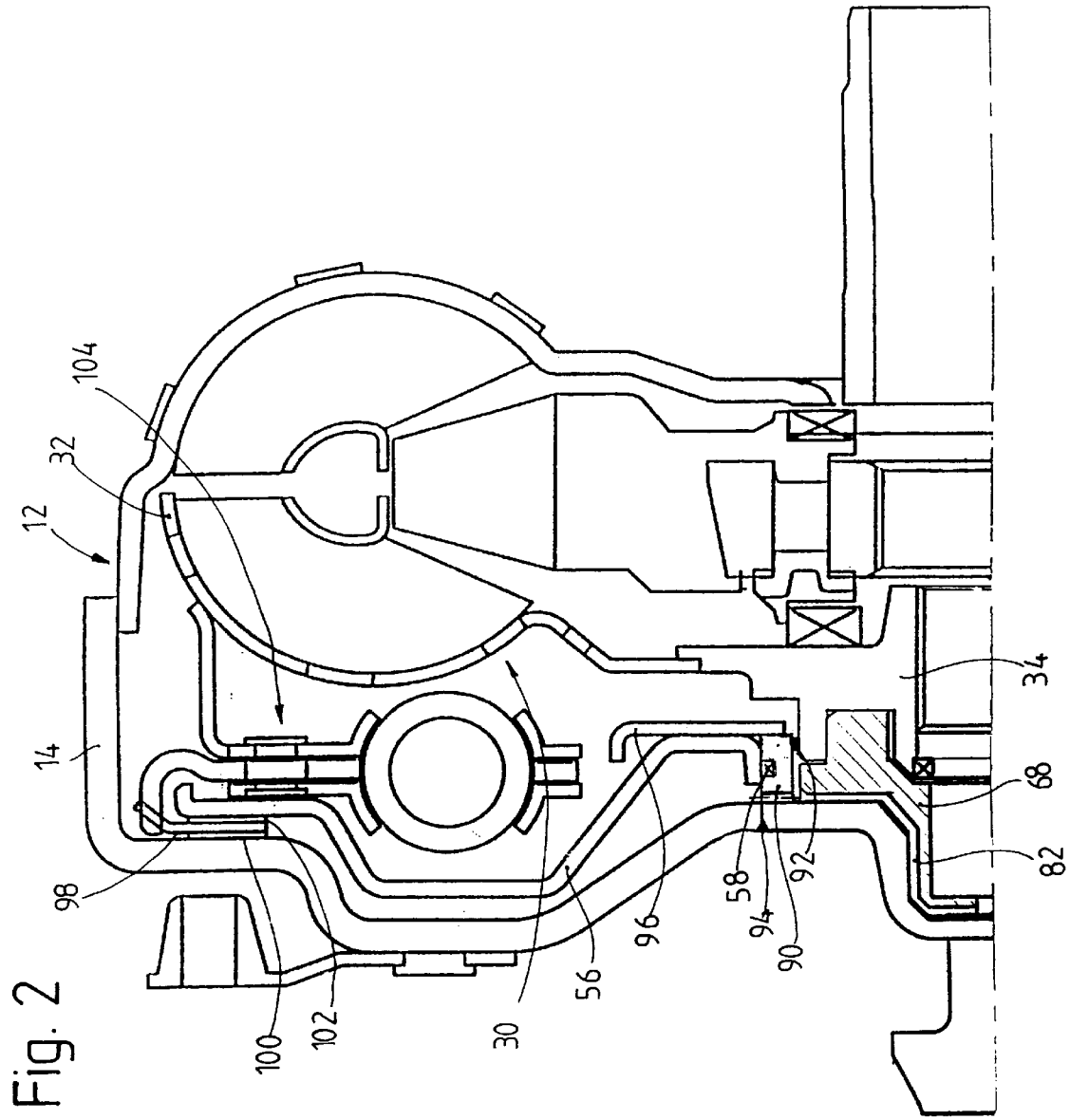
FIG. 2 shows a view, corresponding to FIG. 1, of a modification of the variant embodiment illustrated in FIG. 1.

A modification to the variant embodiment illustrated in FIG. 1 is to be seen in FIG. 2. Components which correspond to previously described components with regard to design and/or function are denoted by the same reference symbols.

The essential difference consists here in the fact that the clutch piston 56 is now held in a rotationally secure fashion not relative to the turbine wheel 30 but relative to the housing 12. For this purpose, the sliding bearing element 68 is welded onto the housing cover 14 in a fashion surrounded by the guide element 90, and this guide element 90 is sealed off from the turbine wheel hub 34 in a fluid-tight fashion by means of a sealing arrangement 92 in the variant represented. Just like the sliding bearing element 68, the guide element 90 has a fluid channel arrangement 94, which is partially closed by the housing cover 14 and which can, for example, correspond in terms of its configuration to the channels 82 in the sliding bearing element 68, being in fluid exchange communication with said channels 82. The clutch piston 56 is now guided in an axially movable fashion on the guide element 90, with the interposition of the sealing element 58. Furthermore, a driver element 96 is fixed on the guide element 90, for example by means of welding. Acting between this driver element 96 and the clutch piston 56 are connecting elements, for example leaf spring elements extending approximately in the circumferential direction, which are fixed in one end region on the driver element 96 and in the other end region on the clutch piston 56, with the result that the clutch piston 56, although connected in a rotationally secure fashion to the driver element 96 and thus also to the guide element 94, can be displaced axially relative to the leaf spring elements because of the possibility of deforming the latter.

Provided now radially on the outside is a friction lining lamella 98 which bears friction linings 100, 102 on its two axial sides and can be clamped between the clutch piston 56 and the housing cover 14. The friction lining lamella 98 is connected to the turbine wheel 30, in particular the turbine wheel shell 32, for the purpose of joint rotation, for example via a torsional vibration damping arrangement 104.

Otherwise, the variant embodiment represented in FIG. 2 corresponds, particularly with regard to the design and/or mode of operation of the sliding bearing element 68, to the variant embodiment previously described with reference to FIG. 1.

Figure 3:
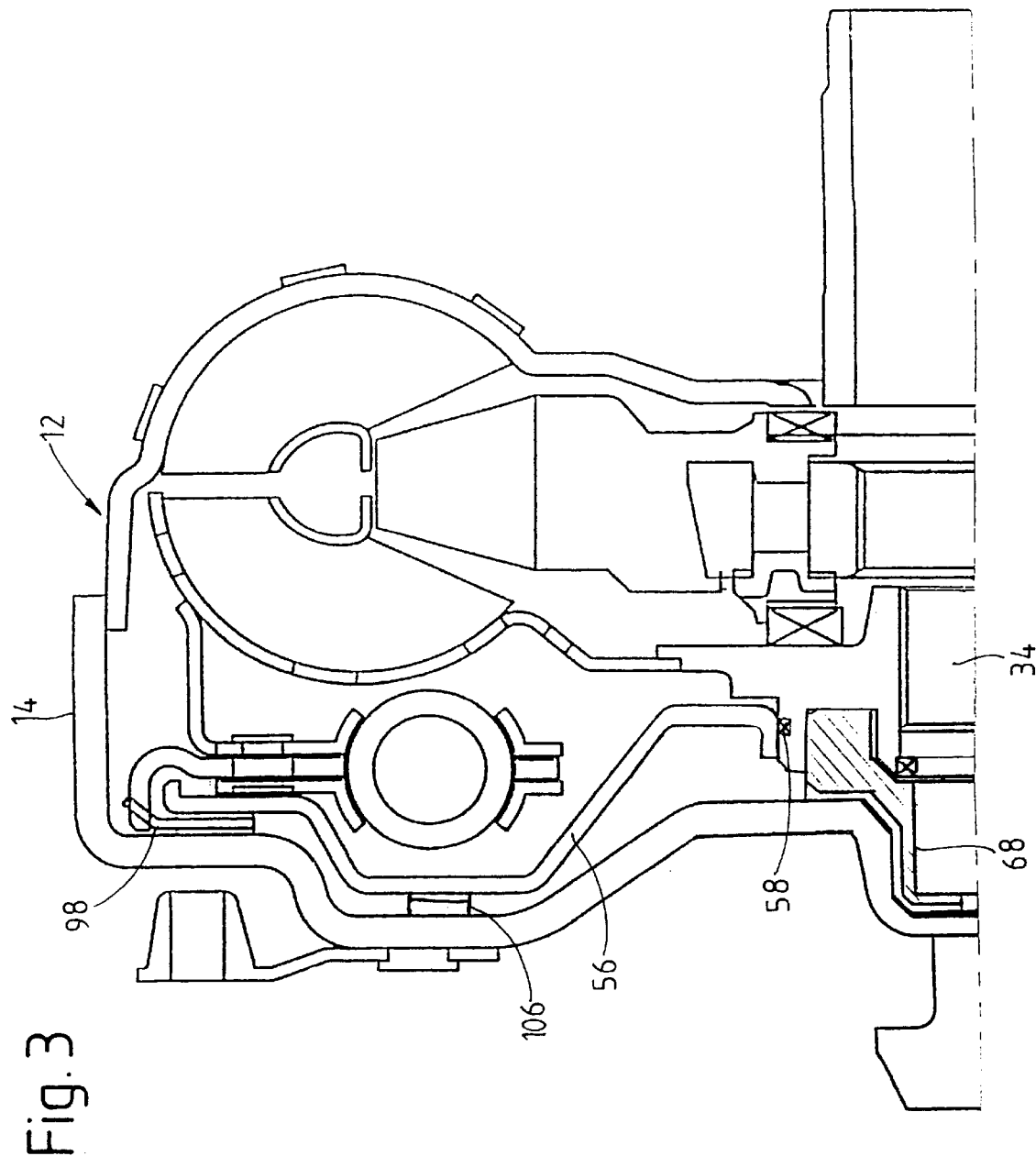
FIG. 3 shows a further view, corresponding to FIG. 1, of a modification of the variant embodiment illustrated in FIG. 1.

A further modification of this functional and/or design principle is shown in FIG. 3. In this variant embodiment, the rotationally secure connection between the clutch piston 56 and the housing 12, that is to say the housing cover 14, is now provided directly by connecting elements, for example leaf spring elements 106 again, acting on these two modules. The clutch piston 56 can be moved axially, with the interposition of the sealing element 58, on the turbine wheel hub 34, but is guided close relative to said hub and in a rotatable fashion in the circumferential direction. It may also be pointed out that in the case of this variant embodiment, as well, the sliding bearing element 68 is essentially constructed and/or acts as described with reference to FIG. 1. It may further be pointed out that in the variants in accordance with FIGS. 2 and 3, the connecting elements 106 of the type of leaf springs can pretension the clutch piston 56, with the result that the latter is already pretensioned against the friction lining lamella 98.

Figure 4:
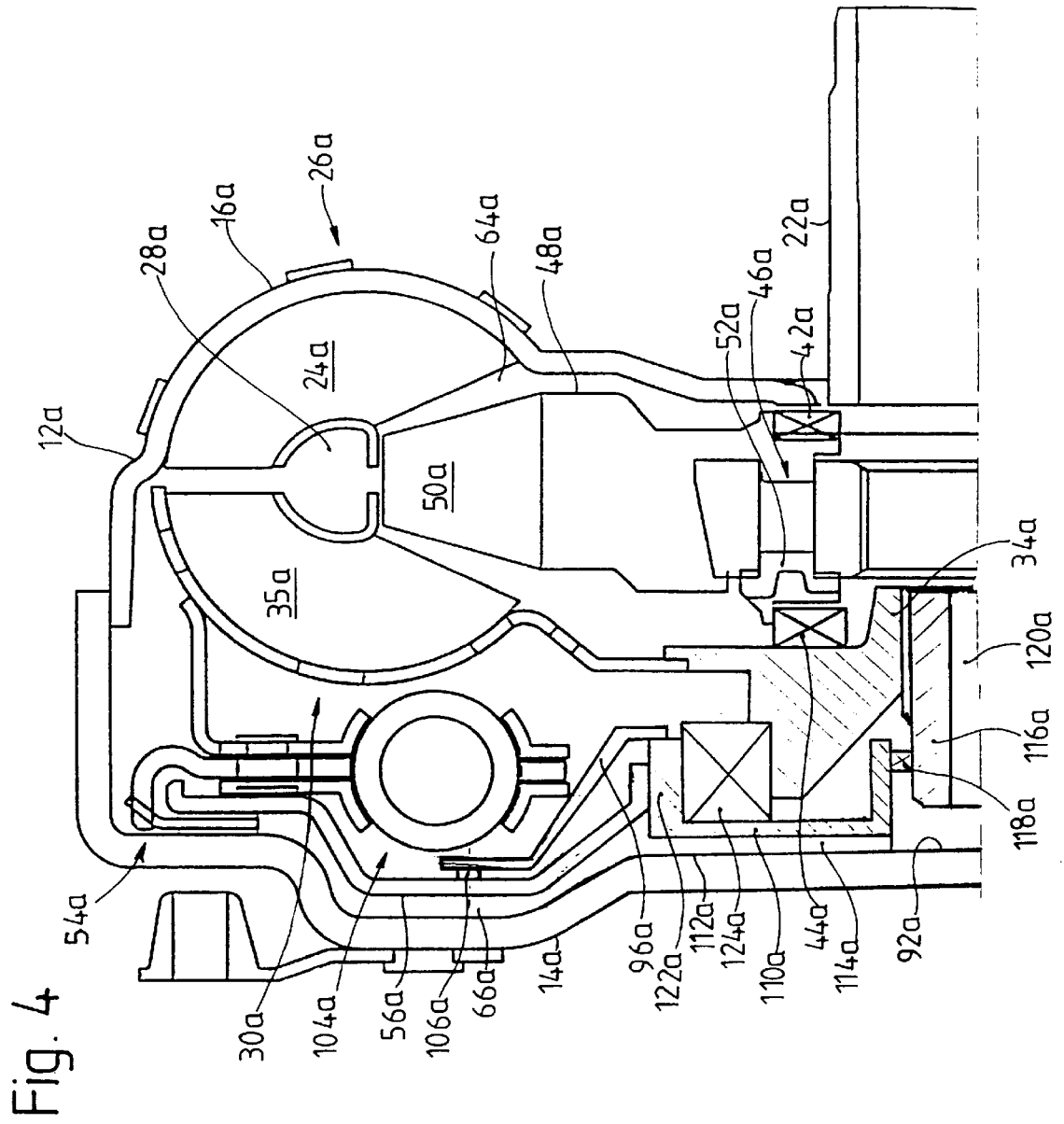
FIG. 4 shows a partial longitudinal section through an alternative variant embodiment of the coupling device according to the invention.

An alternative type of embodiment of a hydrodynamic coupling device according to the invention is shown in FIG. 4. Components which correspond with regard to design and/or function with previously described components are denoted by the same reference numerals with the addition of an appended "a". It is essentially the structural differences in relation to the variant embodiments previously described which are considered below.

In the case of the variant embodiment illustrated in FIG. 4, a bearing element 110a is fixed on the housing cover 14a, for example by laser welding or in some other way. On its surface 112a facing the housing cover 14a, the bearing element 110a again has a plurality of groove-like channels 114a which extend essentially in the radial direction and lead hydraulic fluid present in the space 66a radially inward into the region of the output shaft 116a illustrated in its end section. The bearing element 110a has a cylindrical attachment which is situated radially on the inside and with the aid of which it reaches over the end of the output shaft 116a and is sealed in a fluid-tight fashion relative to said end by means of a sealing arrangement 118a. The hydraulic fluid flowing radially inward through the channel-like depressions 114a can then be removed via the axial passage opening 120a in the output shaft 116a.

Radially on the outside, the bearing element 110a has a further essentially cylindrical attachment 122a, on which the clutch piston 56a can be moved axially and is guided in a fluid-tight fashion, if appropriate with the interposition of a seal. A disk-like driver element 96a can, in turn, be fixed on this attachment 122a, which element holds the clutch piston 56a via a plurality of connecting elements 106a in a fashion which is axially movable but essentially rotationally secure on the bearing element 110a, and thus on the housing cover 14a.

A combined axial/radial bearing 124a is supported on the bearing element 110a in the radially outer region in such a way that it bears the turbine wheel hub 34a both axially and radially relative to the housing 12a. In particular, it is to be seen that this bearing 124a is supported radially outward on the cylindrical attachment 122a, which simultaneously serves to guide the clutch piston 56a. This bearing 124a is preferably a rolling-element bearing having a multiplicity of rolling elements positioned sequentially in the circumferential direction, such as balls, but can likewise, also be a sliding bearing in the form of an annularly constructed sliding bearing element.

With this arrangement, as well, the advantage results, once again, that the groove-like depressions 114a can be configured with virtually any desired configuration, since they are produced not by introducing bores, but by forming depressions in a surface, these depressions then being covered by the housing cover 14a. Thus, in the case of optimized bearing of the turbine wheel 30a relative to the housing 12a, it is possible nevertheless to produce a hydraulic fluid channel arrangement, optimized with regard to fluid passage, in the form of the depressions 114a.

Figure 5:
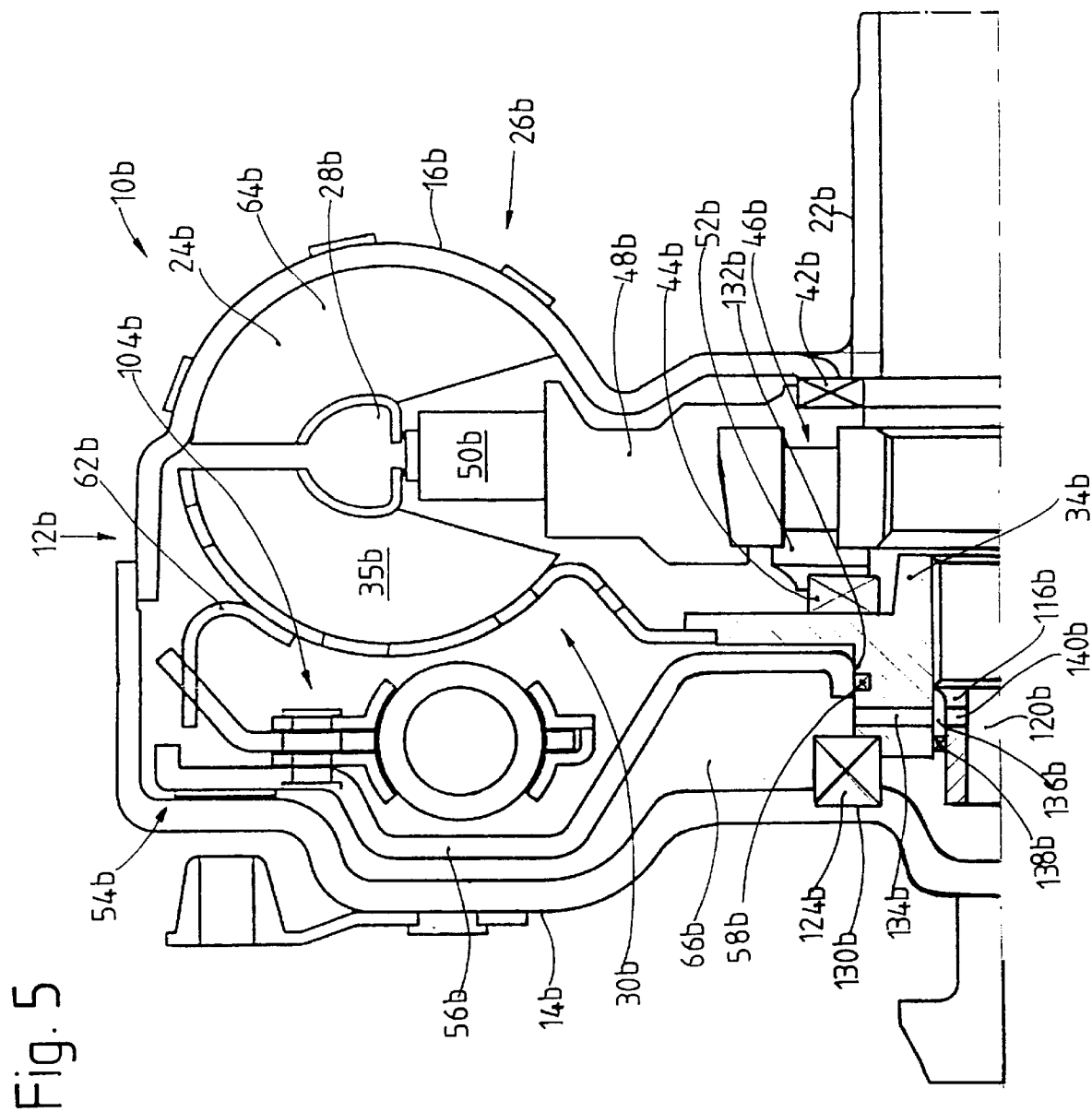
FIG. 5 shows a partial longitudinal section through an alternative variant embodiment of the coupling device according to the invention.

A further embodiment according to the invention of a hydrodynamic torque converter is shown in FIG. 5. Components which correspond with regard to design and/or function to previously described components are denoted by the same reference numerals with the addition of an appended "b". Once again, only the structural differences will be considered below.

In the case of the embodiment in accordance with FIG. 5, the turbine wheel 30b is supported directly on the housing cover 14b with its turbine wheel hub 34b by means of a combined axial/radial bearing 124b. In order to maintain the radial bearing, the housing cover 14b has a recess 130b which is limited at least radially outward, and in which the bearing 124b is supported radially outward. Furthermore, the clutch piston 56b is guided axially in a fluid-tight fashion, again with the interposition of the seal 58b, on the turbine wheel hub 34b on a cylindrical outer circumferential surface 132b of the same. The clutch piston 56b is joined to the turbine wheel 30b in the radially outer region by means of a torsional vibration damping arrangement 104b and the driver element 62b. In the region located axially between the axial guide of the clutch piston 56b and the support on the bearing 124b, the turbine wheel hub 34b preferably has, distributed in the circumferential direction, a plurality of passage openings 134b which open into an interspace 136b which is formed radially between the turbine wheel hub 34b and the output shaft 116b (illustrated only in its end region). This interspace 136b is sealed by sealing arrangements, such as the annular seal 138b illustrated, preferably toward both axial sides. The output shaft 116b correspondingly has at least one passage opening 140b which opens into the axial passage opening 120b, with the result that the hydraulic fluid approaching from radially outside in the space 66b can pass via the passage opening 134b, the interspace 136b and the passage openings 140b into the axial passage opening 120b, and can be removed from the latter.

This arrangement also permits, in the smallest space, both the axial and radial support of the turbine wheel 30b relative to the housing 12b, and the feeding of the hydraulic fluid into the axial passage opening 120b in the output shaft 116. It may also be pointed out here that the passage openings 134b need not extend in an exactly radial fashion, but can have a configuration which is oblique or curved in the circumferential direction. A curved configuration can be produced, in particular, when using a sintering method to manufacture the turbine wheel hub.

Figure 6:
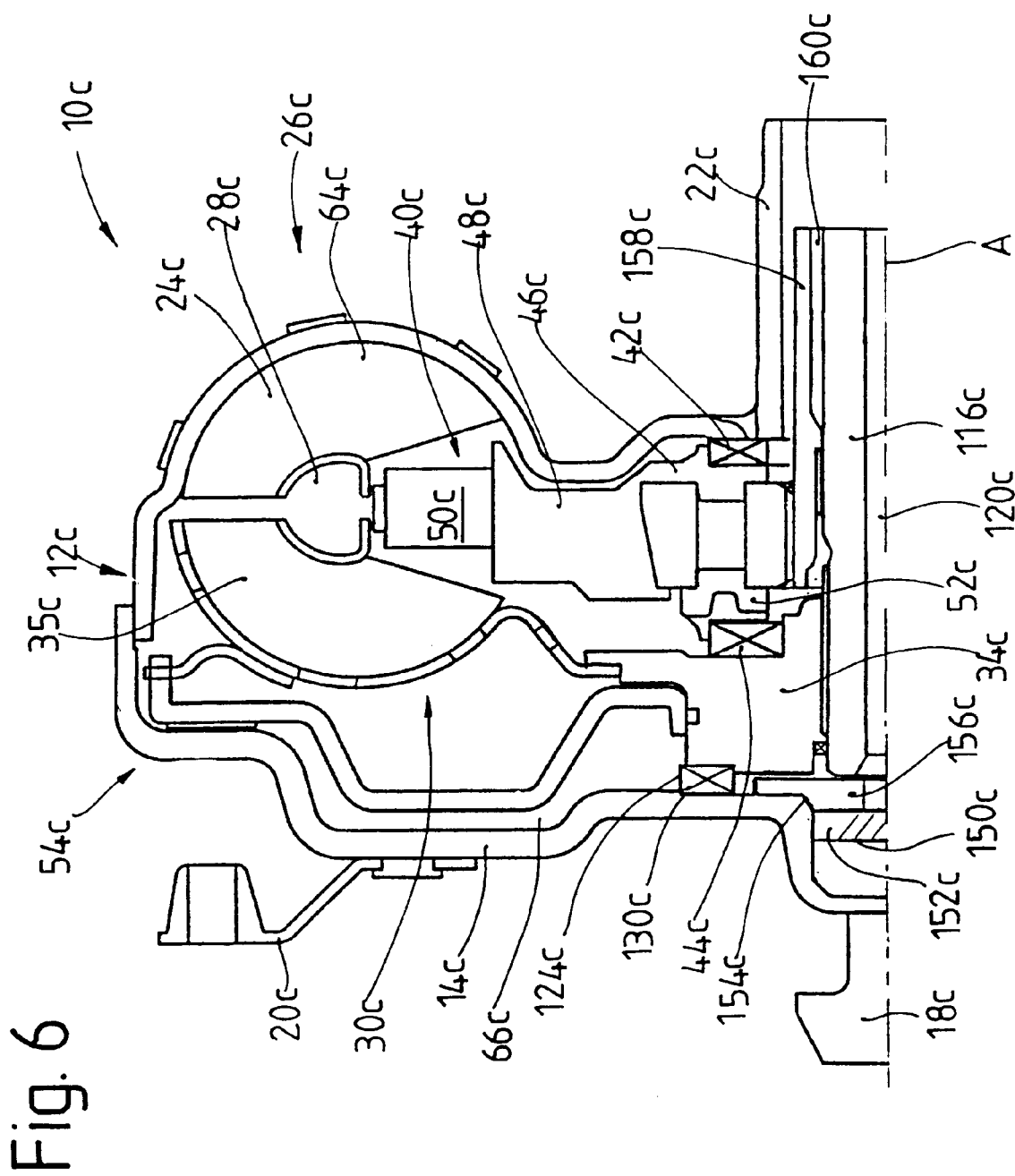
FIG. 6 shows a further alternative variant embodiment of the coupling device according to the invention, in partial longitudinal section.

A further type of embodiment of a coupling device according to the invention in the form of a torque converter is shown in FIG. 6. Components which correspond with regard to design and/or function to previously described components are described with the same reference numerals with the addition of an appended "c". Moreover, as well, only the structural differences are considered, in particular in the region of the axial support and/or the fluid guidance.

It is to be seen that the turbine wheel hub 34c is again supported directly on the housing cover 14c with the interposition of a bearing 124c. This bearing 124c can be held or supported, for example once again in a depression 130c or on a shoulder-shaped recess, with the result that it provides both the radial and the axial bearing of the turbine wheel 30c relative to the housing 12c. A fluid flow guiding element 150c is provided radially inside the bearing 124c on the housing cover 14c. Said element is fixed to a fastening section in a pot-like recess 154c in the housing cover 14, for example by being press fitted therein. Furthermore, the fluid flow guiding element 150c has a plurality of groove-like depressions 156c, following one another in the circumferential direction and leading radially inward, which are open on the side facing the turbine wheel 30c or the output shaft 116c, as may be seen from FIG. 6. After it has penetrated the bearing 124c suitable for fluid passage, the hydraulic fluid approaching from the space 66c can pass once again via these channels into the radially inner region, and thus into the axial passage opening 120c of the output shaft 116c. This fluid flow guiding element 150c can be produced from the same materials as described previously with reference to the sliding bearing element 68 in FIGS. 1–3.

It may be pointed out that here, for example, the bearing 124c can be constructed as an annularly constructed sliding bearing with a multiplicity of grooves or channel-like openings for fluid passage. However, it is also possible in principle to use a rolling-element bearing which is pervious to fluid.

It may further be pointed out that the support element 158c, constructed as a hollow shaft, of the stator 40c or of the freewheeling mechanism 46c may be seen in FIG. 6. The hydraulic fluid can then pass into the interior 28c of the torque converter 10c through an interspace 160c, formed between the output shaft 116c and this hollow shaft 158c, and the passage 52c. It may further be pointed out that the fluid flow direction relative to the previously described flow direction can, of course, be reversed such that the hydraulic fluid can be fed via the axial passage opening 120c and removed from the interspace 160c just described. Furthermore, it is also possible for the inventive principle of combining the axial and/or radial bearing and the hydraulic fluid guidance to be used even in the case of a torque converter of the three-line type, in the case of which it is possible for hydraulic fluid to be introduced into the space 64 and removed again directly from said space, and for hydraulic fluid to be fed into the space 66 and/or removed therefrom separately, in order to engage or disengage the lockup clutch 54. Of course, it is also possible to use the inventive principle in the case of another hydrodynamic coupling device such as, for example, a fluid clutch, which likewise has a turbine wheel which can rotate relative to a housing.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A hydrodynamic coupling device, comprising:
a housing for holding hydraulic fluid;
a turbine wheel,
an output shaft, the turbine wheel being connected with the output shaft for rotation therewith; and
a sliding bearing arrangement for rotatably supporting the turbine wheel in the housing, said sliding bearing arrangement including a hydraulic fluid channel for passage of hydraulic fluid in radially outward and radially inward flow directions relative to a region of the output shaft, the sliding bearing arrangement further including a sliding bearing element fixed on the turbine wheel and supporting the turbine wheel in axial and radial directions relative to the housing, wherein the sliding bearing element has a fastening region fixed on the turbine wheel, the fastening region being connected to the turbine wheel with press fit thereof into a cut out in a hub of the turbine wheel.

2. The hydrodynamic coupling device as claimed in claim 1, in which the sliding bearing element is supported at an inner surface of the housing, the sliding bearing element having a surface region facing the housing.

3. The hydrodynamic coupling device as claimed in claim 2, in which the hydraulic fluid channel comprises at least one groove-like depression provided in the sliding bearing element surface regions, at least a part of the at least one groove-like depression being covered by an inner surface of the housing.

4. The hydrodynamic coupling device as claimed in claim 2, in which the sliding bearing element has at an least axial bearing surface region extending radially, and a radial bearing surface region extending axially.

5. The hydrodynamic coupling device as claimed in claim 2, in which the sliding bearing element has a frusto-conical bearing surface region therewith providing both axial and radial direction support for the turbine wheel with said frusto-conical surface.

6. A hydrodynamic coupling device, comprising:
a housing for holding hydraulic fluid;
a turbine wheel,
an output shaft, the turbine wheel being connected with the output shaft for rotation therewith; and
a sliding bearing arrangement for rotatably supporting the turbine wheel in the housing, said sliding bearing arrangement including a hydraulic fluid channel for passage of hydraulic fluid in radially outward and radially inward flow directions relative to a region of the output shaft, the sliding bearing arrangement further including a sliding bearing element fixed on the turbine wheel and supporting the turbine wheel in axial and radial directions relative to the housing, the sliding bearing element being formed from one of fiber-reinforced plastic, a sintered metal, and aluminum.

7. The hydrodynamic coupling device according to claim 6, in which the fiber-reinforced plastic is one of a polymide 6, 6, a polymide 4, 6, and polyetherketone.

8. A hydrodynamic coupling device, comprising:
a housing for holding hydraulic fluid;
a turbine wheel,
an output shaft, the turbine wheel being connected with the output shaft for rotation therewith; and
a sliding bearing arrangement for rotatably supporting the turbine wheel in the housing, said sliding bearing arrangement including a hydraulic fluid channel for passage of hydraulic fluid in radially outward and radially inward flow directions relative to a region of the output shaft, the sliding bearing arrangement further including a sliding bearing element fixed on the turbine wheel and supporting the turbine wheel in axial and radial directions relative to the housing, wherein in a region of the sliding bearing element extends radially inward from the outer circumference of the output shaft to a location proximal an axis of rotation of the output shaft and has a passage opening for connecting the hydraulic fluid channel arrangement to an axial passage opening constructed through the output shaft.

9. A hydrodynamic coupling device, comprising:
a housing for holding hydraulic fluid;
a turbine wheel,
an output shaft, the turbine wheel being connected with the output shaft for rotation therewith; and
a sliding bearing arrangement for rotatably supporting the turbine wheel in the housing, said sliding bearing arrangement including a hydraulic fluid channel for passage of hydraulic fluid in radially outward and radially inward flow directions relative to a region of the output shaft, the sliding bearing arrangement further including a sliding bearing element fixed on the turbine wheel and supporting the turbine wheel in axial and radial directions relative to the housing, in which a guide element surrounds the sliding bearing arrangement, the device further including:
a lockup clutch, the lockup clutch including a clutch element, the clutch element being guided by said guide element to move in the axial direction, the guide element having a hydraulic fluid channel which is connected in fluid exchange communication with the sliding bearing arrangement fluid channel, said guide element being sealed off from at least one of said turbine wheel and said sliding bearing element such that an exchange of hydraulic fluid occurs only through the two said hydraulic fluid channels.

10. A hydrodynamic coupling device, comprising:
a housing for holding hydraulic fluid;
a turbine wheel;
an output shaft, the turbine wheel being connected with the output shaft for rotation therewith; and
a bearing arrangement for rotatably supporting the turbine wheel in the housing, said bearing arrangement including a hydraulic fluid channel for passage of hydraulic fluid in radially outward and radially inward flow directions relative to a region of the output shaft, the bearing arrangement including a bearing for supporting the turbine wheel axially and radially relative to the housing, the bearing arrangement further including a bearing element which is fixed at an inner surface of the housing, said bearing element having a surface facing an inner surface of the housing, said bearing element surface having at least one groove-like depression defining the hydraulic fluid channel, the groove like-depression being at least partially covered by said housing inner surface, the bearing being supported on the bearing element on a housing side, and
a clutch element of a lockup clutch arrangement is guided in the housing for movement axially on the bearing element.

11. The hydrodynamic coupling device as claimed in claim 10, in which the clutch element is connected rotationally secure to the bearing element.

12. The hydrodynamic coupling device as claimed in claim 11, in which the bearing element is sealed off from the output shaft at a radially inner region.

13. A hydrodynamic coupling device, comprising:

a housing for holding hydraulic fluid;

a turbine wheel having a hub;

an output shaft, the turbine wheel being connected with the output shaft for rotation therewith; and a bearing arrangement for rotatably supporting the turbine wheel in the housing and at least one of axially and radially relative to the housing, said bearing arrangement including a hydraulic fluid channel for passage of hydraulic fluid in radially outward and radially inward flow directions relative to a region of the output shaft, the hydraulic fluid channel including at least a first radially extending passage opening in said hub, and at least a second passage opening in the output shaft, said at least a second passage opening extending radially and being connected to an axial passage in said output shaft.

14. The hydrodynamic coupling device as claimed in claim 13, in which the at least one first passage opening and the at least one second passage opening are situated in a common axial region.

15. The hydrodynamic coupling device as claimed in claim 14, in which the at least one first passage opening and the at least one second passage opening open into an interspace formed between the turbine wheel hub and the output shaft, said interspace being axially sealed off.

16. A hydrodynamic coupling device, comprising:

a housing for holding hydraulic fluid;

a turbine wheel having a hub;

an output shaft, the turbine wheel being connected with the output shaft for rotation therewith, a bearing arrangement for rotatably supporting the turbine wheel in the housing and axially and radially relative to the housing, and a fluid guiding element on the housing through which fluid flowing from a radially outside location is directed into an axial passage opening in said output shaft, said fluid guiding element directing fluid flowing from the output shaft to said radially outside location, the fluid guiding element being radially inside said bearing arrangement.

17. The hydrodynamic coupling device as claimed in claim 16, in which the fluid guiding element is press fit into a depression in the housing.

18. The hydrodynamic coupling device as claimed in claim 16, wherein the bearing arrangement comprises a sliding bearing.

19. The hydrodynamic coupling device as claimed in claim 16, wherein the fluid guiding element has at least one groove-like fluid guiding depression which is open on a side thereof facing the output shaft.

* * * * *